(12) United States Patent
Jean et al.

(10) Patent No.: US 7,289,605 B1
(45) Date of Patent: *Oct. 30, 2007

(54) PROCESSES AND SYSTEMS FOR CREATING AND FOR MANAGING TROUBLE TICKETS AND WORK ORDERS

(75) Inventors: David R. Jean, Palo Alto, CA (US); Judy M. Marcopulos, Duluth, GA (US); Rita H. Scherer, Birmingham, AL (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 458 days.

This patent is subject to a terminal disclaimer.

(21) Appl. No.: 09/946,271

(22) Filed: Sep. 4, 2001
(Under 37 CFR 1.47)

(51) Int. Cl.
*H04M 1/24* (2006.01)
*H04M 3/08* (2006.01)
*H04M 3/22* (2006.01)

(52) U.S. Cl. ............... 379/32.01; 379/9.02; 379/9.03; 379/9.04

(58) Field of Classification Search ............... 379/2, 379/5, 10.1–10.3, 12–13, 14, 15.01–15.05, 379/26.01–26.02, 27.01, 27.08, 29.01–29.11, 379/32.01–32.05, 9.02–9.04
See application file for complete search history.

(56) References Cited

U.S. PATENT DOCUMENTS

| | | | | |
|---|---|---|---|---|
| 4,464,543 A | * | 8/1984 | Kline et al. | 379/224 |
| 5,155,761 A | | 10/1992 | Hammond | 379/67 |
| 5,285,494 A | * | 2/1994 | Sprecher et al. | 455/423 |
| 5,406,616 A | | 4/1995 | Bjorndahl | 379/59 |
| 5,689,550 A | | 11/1997 | Garson et al. | |
| 5,784,438 A | | 7/1998 | Martinez | 379/89 |
| 5,790,633 A | * | 8/1998 | Kinser et al. | 379/9.02 |
| 5,793,771 A | | 8/1998 | Darland et al. | 370/467 |
| 5,893,906 A | | 4/1999 | Daffin et al. | |
| 5,920,846 A | | 7/1999 | Storch et al. | |
| 5,937,048 A | | 8/1999 | Pelle | |
| 5,946,372 A | | 8/1999 | Jones et al. | |
| 5,946,373 A | | 8/1999 | Harris | |
| 5,956,024 A | | 9/1999 | Strickland et al. | |
| 6,006,171 A | | 12/1999 | Vines et al. | |

(Continued)

FOREIGN PATENT DOCUMENTS

WO    WO 02/45393 A2    6/2002

OTHER PUBLICATIONS

An Extensible Message Format for Message Disposition Notifications, R. Fajman, National Institutes of Health, Mar. 1998.

(Continued)

*Primary Examiner*—Quoc Tran
(74) *Attorney, Agent, or Firm*—Cantor Colburn LLP

(57) ABSTRACT

Processes and systems are disclosed for creating and for managing trouble tickets and work orders. One embodiment includes communicating with a communications network and receiving a request to create a trouble ticket. The trouble ticket is created to investigate a problem with a communications system. The trouble ticket is assigned a work item number, with the work item number including a telephone number experiencing the problem with the communications system. The trouble ticket is tracked, from initial creation to final closure, using the assigned work item number.

17 Claims, 16 Drawing Sheets

U.S. PATENT DOCUMENTS

| | | |
|---|---|---|
| 6,018,567 A | 1/2000 | Dulman |
| 6,032,039 A | 2/2000 | Kaplan ........................ 455/413 |
| 6,173,047 B1 | 1/2001 | Malik .......................... 379/207 |
| 6,175,859 B1 | 1/2001 | Mohler ........................ 709/206 |
| 6,263,322 B1 | 7/2001 | Kirkevold et al. |
| 6,289,382 B1 | 9/2001 | Bowman-Amuah |
| 6,295,540 B1 | 9/2001 | Sanschargrin et al. |
| 6,353,902 B1 | 3/2002 | Kulatunge et al. |
| 6,356,928 B1 | 3/2002 | Rochkind |
| 6,401,090 B1 | 6/2002 | Bailis et al. |
| 6,445,774 B1 | 9/2002 | Kidder et al. ............... 379/9.03 |
| 6,446,123 B1 | 9/2002 | Ballantine et al. |
| 6,493,694 B1 | 12/2002 | Xu et al. |
| 6,614,882 B1 | 9/2003 | Beamon et al. |
| 6,633,782 B1 | 10/2003 | Schleiss et al. |
| 6,636,486 B1 | 10/2003 | Magloughlin |
| 6,678,370 B1 | 1/2004 | Freebersyser et al. |
| 6,788,765 B1 | 9/2004 | Beamon |
| 6,845,148 B1 | 1/2005 | Beamon |
| 6,870,900 B1 | 3/2005 | Beamon |
| 6,937,993 B1 | 8/2005 | Gabbita et al. |
| 6,961,415 B2 | 11/2005 | Doherty et al. |
| 2001/0029504 A1 | 10/2001 | O'Kane, Jr. et al. |
| 2002/0161731 A1 | 10/2002 | Tayebnejad et al. |
| 2002/0168054 A1 | 11/2002 | Klos et al. |
| 2003/0069797 A1 | 4/2003 | Harrison |
| 2003/0187752 A1 | 10/2003 | Kapianen et al. |
| 2004/0022379 A1 | 2/2004 | Klos et al. |
| 2004/0260668 A1 | 12/2004 | Bradford |
| 2006/0050862 A1 | 3/2006 | Shen et al. |

OTHER PUBLICATIONS

Impact Voice Mail Server Deluxe, Black Ice Software Inc., CTI Expo, Spring 1999.
BellSouth Memory Call VoiceMail Services, 1999.
Voice Profile for Internet Mail—Version 2, G. Vaudreuil—Lucent Technologies and G. Parsons—Northern Telecom, Sep. 1998.
IP Infrastructure: The Fastest Track for Tomorrow's Unified Communications, Arthur Rosenberg and David Zimmer, The Unified View, Oct. 2000.
TDB: Computerized Call Return Feature, IBM Technical Disclosure Bulletin, Apr. 1986.
US 6,826,262, 11/2004, Jean et al. (withdrawn)

* cited by examiner

PROCESSES AND SYSTEMS FOR CREATING AND FOR MANAGING TROUBLE TICKETS AND WORK ORDERS

BACKGROUND OF THE INVENTION

Notice of Copyright Protection

A portion of the disclosure of this patent document and its figures contain material subject to copyright protection. The copyright owner has no objection to the facsimile reproduction by anyone of the patent document or the patent disclosure, but otherwise reserves all copyrights whatsoever.

1. Field of the Invention

This invention generally relates to work order and trouble ticket management systems and, more particularly, to processes and systems that manage and that broker work orders and trouble tickets from initial creation to final closure.

2. Description of the Related Art

Most residential and business telephone customers are connected to telephone/communication systems by copper cables and wires. These copper cables are the familiar one or more telephone lines running throughout nearly every home in the United States. Because copper cable and wire connects each home, and many businesses, to the communication system, the Public Switched Telephone Network is composed of billions of copper cables and wires. Each of these copper cables must be maintained to provide superior service to the customer.

Yet maintaining these copper cables and wires is an extraordinary task. The Public Switched Telephone Network, with its millions of copper cables and wires, may receive hundreds of maintenance calls per day. These maintenance calls, in turn, may result in hundreds of maintenance trouble tickets. These hundreds of daily maintenance calls, and the resultant trouble tickets, must be efficiently managed to prevent maintenance costs from eroding profits. These resultant trouble tickets must also be efficiently managed to ensure customers receive a quick response and a quick resolution to their communication problems.

While efficiency and service are the goals, communication service providers struggle with trouble management systems that are decades-old. Most service providers are continually resuscitating legacy computer equipment and computer code. The computer equipment is often so old that spare parts are no longer available. The computer code of these early systems is also outdated, requiring specialized knowledge of older code to keep the system maintained. These legacy management systems are, thus, challenging and expensive to maintain and to preserve.

The legacy management systems are also inefficient, slow, and inaccurate. The legacy Loop Maintenance Operating System, for example, maintains an extremely large database of over twenty four million (+24,000,000) line records. As more and more customers request additional telephone lines, digital subscriber lines, and other plain, old telephone system enhancements, this extremely large database of line records must accordingly grow. Such an extremely large database system inefficiently retrieves line records and is slow to provide such data. Such a large legacy database also means the data is often corrupt. Service providers are simply unable to dynamically update the database as the line records change. Moreover, efficient management techniques, such as correlation and screening of trouble tickets, is hampered by the corrupt data. These old, legacy management systems, therefore, reduce the ability of service providers to meet the growing demands in today's competitive environment.

There is, accordingly, a need in the art for management systems that are less expensive to use and to maintain, that reduce the need for large database infrastructures, that meet or exceed current performance levels, that are more reliable configurations, that improve the use of correlation, screening, and other efficient management techniques, and that reduce the costs of maintaining operations.

BRIEF SUMMARY OF THE INVENTION

The aforementioned problem are reduced by a Communications Maintenance System. The Communications Maintenance System comprises processes and systems that create and that manage work orders and trouble tickets. The Communications Maintenance System facilitates the creation, management, resolution, and the recording of work orders and of trouble tickets. The Communications Maintenance System maintains all the functionality of the legacy management systems, yet, eliminates the need for an extremely large database of line records. The Communications Maintenance System also performs as well, or even better, than the legacy systems, however, the Communications Maintenance System utilizes a new, modular design that permits future expansion. The processes and systems of the Communications Maintenance System also utilize a highly reliant, modern operating system and program code that is easily maintained. The Communications Maintenance System also provides new capabilities, such as permitting special handling instructions, permitting user comments and annotations, and configuring work orders/trouble tickets by geographic segments.

The Communications Maintenance System reduces human involvement and analysis. The Communications Maintenance System mechanizes the creation and the management of trouble tickets and work orders. The Communications Maintenance System accepts trouble reports, creates a trouble ticket (or a work order) to repair the trouble, logs and tracks the trouble ticket, creates a line record for the trouble, and manages the trouble ticket from creation to final closure. The Communications Maintenance System can correlate trouble tickets into groups that share similar characteristics, and the Communications Maintenance System can screen trouble tickets for known indicators of the trouble. The Communications Maintenance System could even generate reports, and distribute the reports, to mangers, field personnel, and government regulators. The Trouble Ticket Manager thus quickly and automatically diagnoses and resolves customer problems. The Trouble Ticket Manager, therefore, quickly identifies the root cause of problems and efficiently resolves customer complaints.

The Communications Maintenance System is also an improved, efficient design. All the functionality of the current legacy systems are replaced, and the large database of over twenty four million (+24,000,000) line records is eliminated. All current legacy performance levels are met or exceeded. The design is modular and could be extended to other designed services. The Communications Maintenance System is a reliable trouble management configuration built using modern operating systems and equipment. Capacity, therefore, is easily added. The Communications Maintenance System offers advanced load sharing architecture that enhances a service provider's ability to handle trouble tickets in times of disaster, such as hurricanes and tornadoes. Special handling capabilities are provided to capture customer data and to configure any required geographic arrangement. The Communications Maintenance System can also accommodate future services to ensure a long, economical life cycle.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
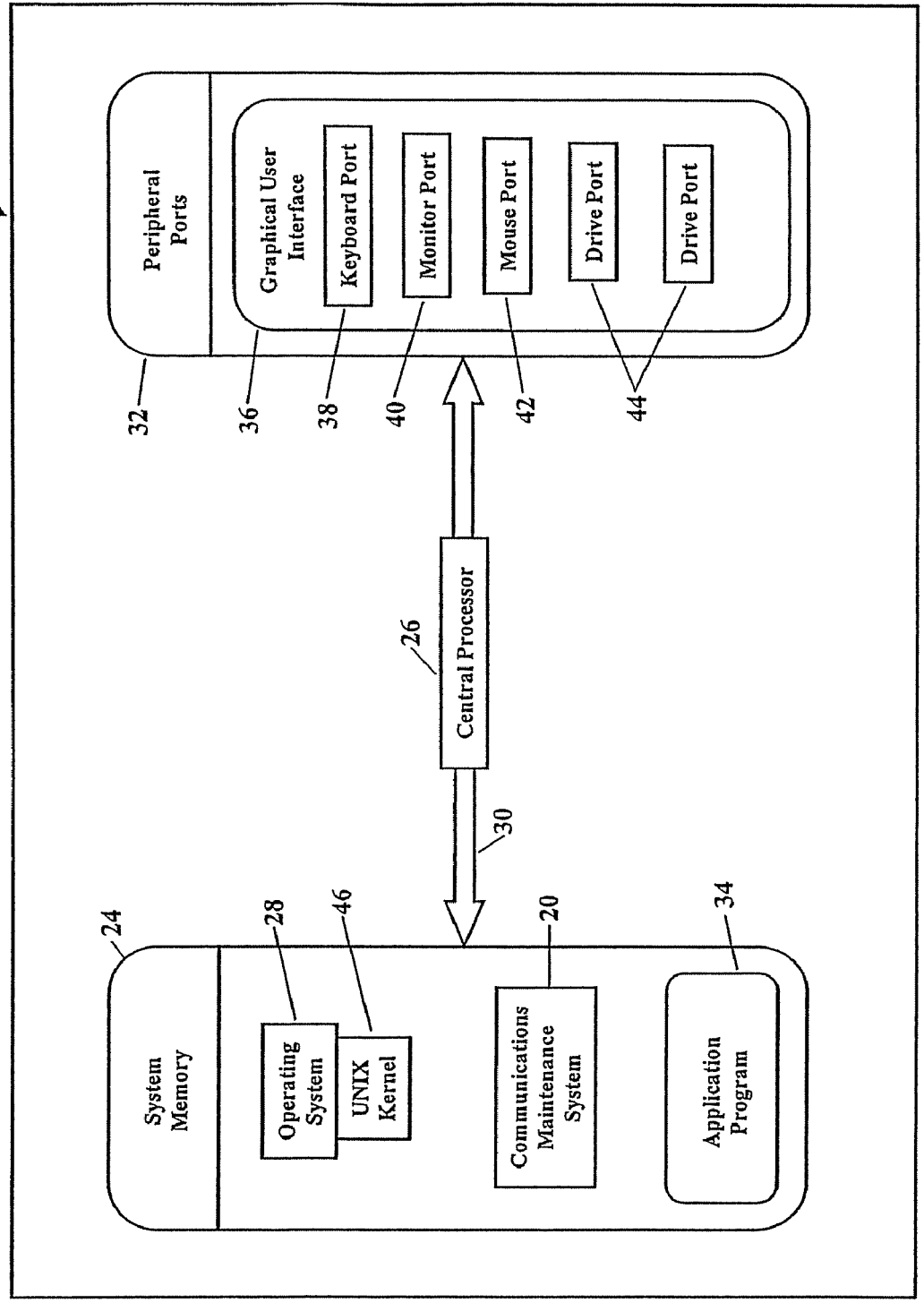
FIG. 1 is a block diagram showing the Communications Maintenance System residing in a computer system.

The present invention particularly relates to processes and to systems for creating and for managing trouble tickets and work orders. One embodiment includes communicating with a communications network and receiving a request to create a trouble ticket. The trouble ticket is created to investigate a problem with a telecommunications system. The trouble ticket is assigned a work item number, with the work item number including a telephone number experiencing the problem with the telecommunications system. The trouble ticket is tracked, from initial creation to final closure, using the assigned work item number.

Another embodiment also discloses a computer program for managing trouble tickets and work orders. A trouble ticket, for example, could describe a problem or trouble with a telephone system local loop. The computer program would communicate with a communications network and receive a request to create the trouble ticket. Information may be acquired from a telephone line record to help resolve the trouble. The information from the telephone line record includes at least one of i) customer information from a Customer Record Information System, ii) facility information from a Loop Facility Assignment Control System, and iii) equipment information from a TELCORDIA™ SWITCH system. The trouble ticket is created to investigate the trouble with the telephone system local loop. A work item number may be assigned to the trouble ticket, with the work item number comprising a telephone number experiencing the trouble with the telephone system local loop. The trouble ticket may also be screened for known indications of the trouble with the telephone system local loop. The trouble ticket may also be correlated with an existing trouble ticket having a common characteristic and having a common designation of a wire center. Once the trouble with the telephone system local loop is resolved, the trouble ticket is closed.

A further embodiment describes a computer program for managing trouble tickets and work orders. A trouble ticket, as before, could describe a problem or trouble with a telephone system local loop. The computer program communicates with a communications network and receives a request to create the trouble ticket. Information is acquired from a telephone line record to help resolve the trouble. The information from the telephone line record comprises at least one of i) customer information from a Customer Record Information System, ii) facility information from a Loop Facility Assignment Control System, and iii) equipment information from a TELCORDIA™ SWITCH system. The computer program may submit a request for a test of the telephone system local loop and receive results of the test. The trouble ticket is created to investigate the trouble, with the trouble ticket comprising at least one of the information from the telephone line record and information from the results of the test of the telephone system local loop. A work item number is assigned to the trouble ticket, with the work item number comprising a telephone number experiencing the trouble with the telephone system local loop. The trouble ticket may be screened for known indications of the trouble with the telephone system local loop. The trouble ticket may also be correlated with an existing trouble ticket having a common characteristic and having a common designation of a telephone system wire center. Once the trouble with the telephone system local loop is resolved, the trouble ticket is closed.

Further embodiments include a system for creating and for managing trouble tickets and work orders. The system includes at least one processor capable of manipulating information to create and to manage a trouble ticket. The system also includes at least one of the following modules: a Trouble Ticket Manager for creating and for managing trouble tickets, a Line Record Assembler module for assembling telephone line records, and a Test Manager module for managing test requests of the telecommunications system.

The Trouble Ticket Manager creates and managers trouble tickets. The Trouble Ticket Manager communicates with a communications network and receives a request to create the trouble ticket. The Trouble Ticket Manager creates the trouble ticket and identifies the trouble ticket with a work item number. The work item number comprises a telephone number experiencing the problem in the telecommunications system. The Trouble Ticket Manager also distributes the trouble ticket along the communications network to clients.

The Line Record Assembler module assembles telephone line records. The Line Record Assembler module communicates information from a telephone line record to the Trouble Ticket Manager. The information from the telephone line record comprises at least one of i) customer information from a Customer Record Information System, ii) facility information from a Loop Facility Assignment Control System, and iii) equipment information from a TELCORDIA™ SWITCH system.

The Test Manager module manages test requests. The Test Manager module receives a request for a test of the telecommunications system. The Test Manager module prioritizes the request for the test according to at least one of a date, a time, an origin of the request to create the trouble ticket, and an origin of the request for the test. The Test Manager module submits the request for the test to a test system conducting the test of the telecommunications system. The Test Manager module then communicates results of the test to the Trouble Ticket Manager.

Another embodiment includes a computer program product for creating and for managing trouble tickets and work orders. This computer program product includes a computer-readable medium and at least one of the following modules stored on the computer-readable medium: a Trouble Ticket Manager for creating and for managing trouble tickets, a Line Record Assembler module for assembling telephone line records, a Test Manager module for managing test requests of the telecommunications system, a Correlation Manager module for correlating similar trouble tickets, a Screening Manager module for isolating the trouble with the telecommunications system, a Status Manager module for managing status changes to the trouble ticket, and a Reporting Manager module for generating maintenance reports describing the status of the trouble ticket.

The Trouble Ticket Manager, as before, creates and manages trouble tickets. The Trouble Ticket Manager receives the request to create the trouble ticket and identifies the trouble ticket with the work item number. The Trouble Ticket Manager distributes the trouble ticket along the communications network to clients.

The Line Record Assembler module, as mentioned earlier, assemblies telephone line records. The Line Record Assembler module communicates the information from the telephone line record to the Trouble Ticket Manager. The information from the telephone line record comprises at least one of i) customer information from a Customer Record information System, ii) facility information from a Loop Facility Assignment Control System, and iii) equipment information from a TELCORDIA™ SWITCH system.

The Test Manager module, as also before, manages test requests. The Test Manager module receives the request for the test of the telecommunications system. The Test Manager module prioritizes the request for the test according to at least one of a date, a time, an origin of the request to create the trouble ticket, and an origin of the request for the test. The Test Manager module submits the request for the test to a test system conducting the test of the telecommunications system, and the Test Manager module communicates results of the test to the Trouble Ticket Manager.

The Correlation Manager module correlates and groups similar trouble tickets. The Correlation Manager module searches or filters the trouble ticket for a user-specified correlation parameter. The Correlation Manager module also searches/filters an existing trouble ticket, found in a database of pending or archived trouble tickets, for the correlation parameter. The Correlation Manager module groups then the trouble ticket with the existing trouble ticket that shares at least one correlation parameter, that shares a common designation of a telephone system wire center, and that shares an annotated date and time within a predetermined interval.

The Screening Manager module isolates the trouble with the telecommunications system. The Screening Manager module searches the trouble ticket for a screening criteria. If the screening criteria is found, the Screening Manager module updates the trouble ticket according to an action corresponding to the search criteria. The action updates at least one of a telephone system status code, a telephone system route code, and a narrative portion describing the telephone system.

The Status Manager module manages status changes to the trouble ticket. The Status Manager module acquires a change in status to the trouble ticket and annotates the change in status with a date and a time. The date and the time reflect the local time zone of the telephone system wire center where the trouble ticket is locally managed. The Status Manager module validates that the annotated date and time are chronologically after a previous change in status to the trouble ticket.

The Reporting Manager module generates maintenance reports. These maintenance reports are then used to provide managers and users with an up-to-date, accurate picture of the operation of the telecommunications system. Maintenance reports are also used to manage and to track open, pending trouble tickets and work orders. These maintenance reports may also be used by the Federal Communications Commission and by state/local public utilities commissions to measure customer service activities. The Reporting Manager module acquires information from the trouble ticket and generates a maintenance report for distribution to the communications network.

Figure 2:
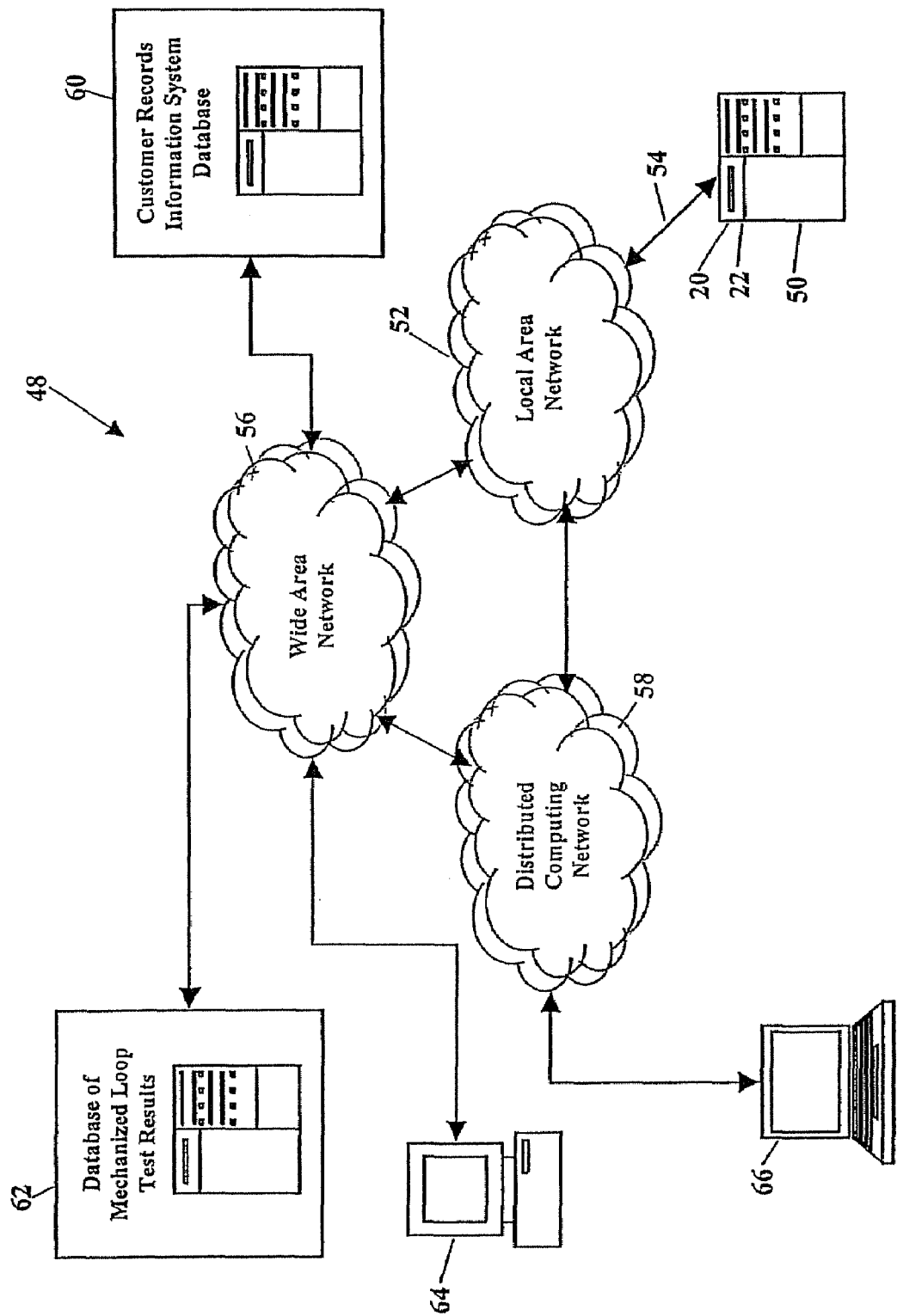
FIG. 2 is a schematic diagram of a communications network representing an alternative operating environment.

FIGS. 1 and 2 depict a possible operating environment for an embodiment of the present invention. This embodiment of a Communications Maintenance System 20 comprises a computer program that creates and manages work orders and trouble tickets. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those of ordinary skill in the art of computer programming, to convey the discoveries in the art.

FIG. 1 is a block diagram showing the Communications Maintenance System 20 residing in a computer system 22. The Communications Maintenance System 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufacture a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algoquin Road, P.O. Box A3309 Schaumburg, Il. 60196, www.motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). While only one microprocessor is shown, those of ordinary skill in the art also recognize multiple processors may be utilized. Those of ordinary skill in the art further understand that the program, processes, methods, and systems described in this patent are not limited to any particular manufacturer's central processor.

The preferred operating system 28 is the UNIX® operating system (UNIX® is a registered trademark of the Open Source Group, www.opensource.org). Those of ordinary skill in the art also recognize many other operating systems are suitable. Other suitable operating systems include UNIX-based Linux, WINDOWS NT® (WINDOWS NT® is a registered trademark of Microsoft Corporation, One Microsoft Way, Redmond Wash. 98052-6399, 425.882.8080, www.Microsoft.com), and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a schematic diagram of a communications network 48. This communications network 48 further represents an operating environment for the Communications Maintenance System 20. The Communications Maintenance System 20 resides within the memory storage device (shown as reference numeral 24 in FIG. 1) in the computer system 22. The computer system 22 is conveniently shown as a computer server 50, however, the Communications Maintenance System 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Communications Maintenance System 20 to request and acquire information from many computers connected to the Local Area Network 52, the Wide Area Network 56, and the globally-distributed computing network 58.

As FIG. 2 shows, the Communications Maintenance System module 20 sends and receives information to/from many other computers connected to the communications network 48. The Communications Maintenance System 20, for example, may acquire customer information from a server maintaining a Customer Records Information System (CRIS) 60. The Communications Maintenance System 20 may also acquire test results from a server maintaining a database 62 of mechanized loop test results. The Communications Maintenance System 20 may also communicate information over the communications network 48 to a user at a user computer 64. FIG. 2 even shows that remote users, such as programmers and engineers, may use a portable computer 66 to access the communications network 48 and remotely access the Communications Maintenance System 20. Because many computers may be connected to the communications network 48, computers and computer users may share and communicate a vast amount of information.

Figure 3:
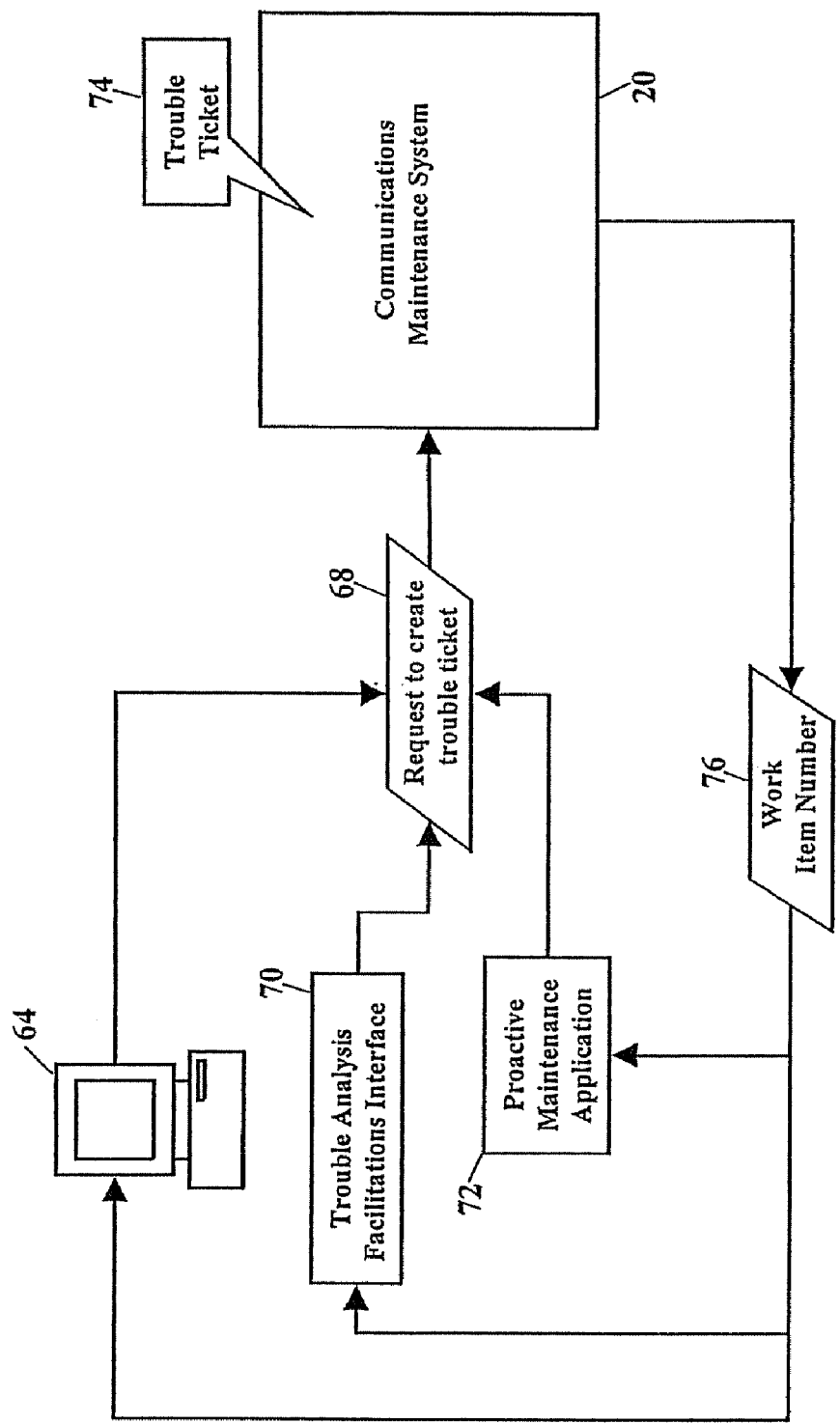
FIG. 3 is a schematic drawing of one embodiment of the Communications Maintenance System.

FIG. 3 is a schematic drawing of one embodiment of the Communications Maintenance System 20. Here the Communications Maintenance System 20 creates trouble tickets and work orders for repair of problems. The Communications Maintenance System 20 then manages the trouble ticket, or the work order, from initial creation until final closure. FIG. 3, for example, shows the Communications Maintenance System 20 receiving a request 68 to create a trouble ticket. The request 68 to create a trouble ticket may be generated by a requestor. The requestor could be either the user, at the user computer 64, or a system that interfaces with the Communications Maintenance System 20. A Trouble Analysis Facilitations Interface 70, for example, is one system that could interface with the Communications Maintenance System 20 and issue the request 68 to create a trouble ticket. The Trouble Analysis Facilitations Interface 70 is typically used by telecommunications service providers when a telephone customer reports trouble with a residential telephone. A Proactive Maintenance Application 72 is another system that could issue the request 68 to create a trouble ticket. The Proactive Maintenance Application 72 is a system that predicts proactive maintenance of telecommunications systems. The Proactive Maintenance Application 72 is more fully shown and described in U.S. application Ser. No. 09/726,751, filed Nov. 30, 2000, entitled PROACTIVE MAINTENANCE APPLICATION, and incorporated herein by reference in its entirety. Once the Communications Maintenance System 20 receives the request 68 to create a trouble ticket, a trouble ticket 74 is created. The trouble ticket 74 is assigned a work item number 76, and the work item number 76 is returned to the requestor. As FIG. 4 will show, the Communications Maintenance System 20 then manages the trouble ticket from initial creation until final closure.

Figure 4:
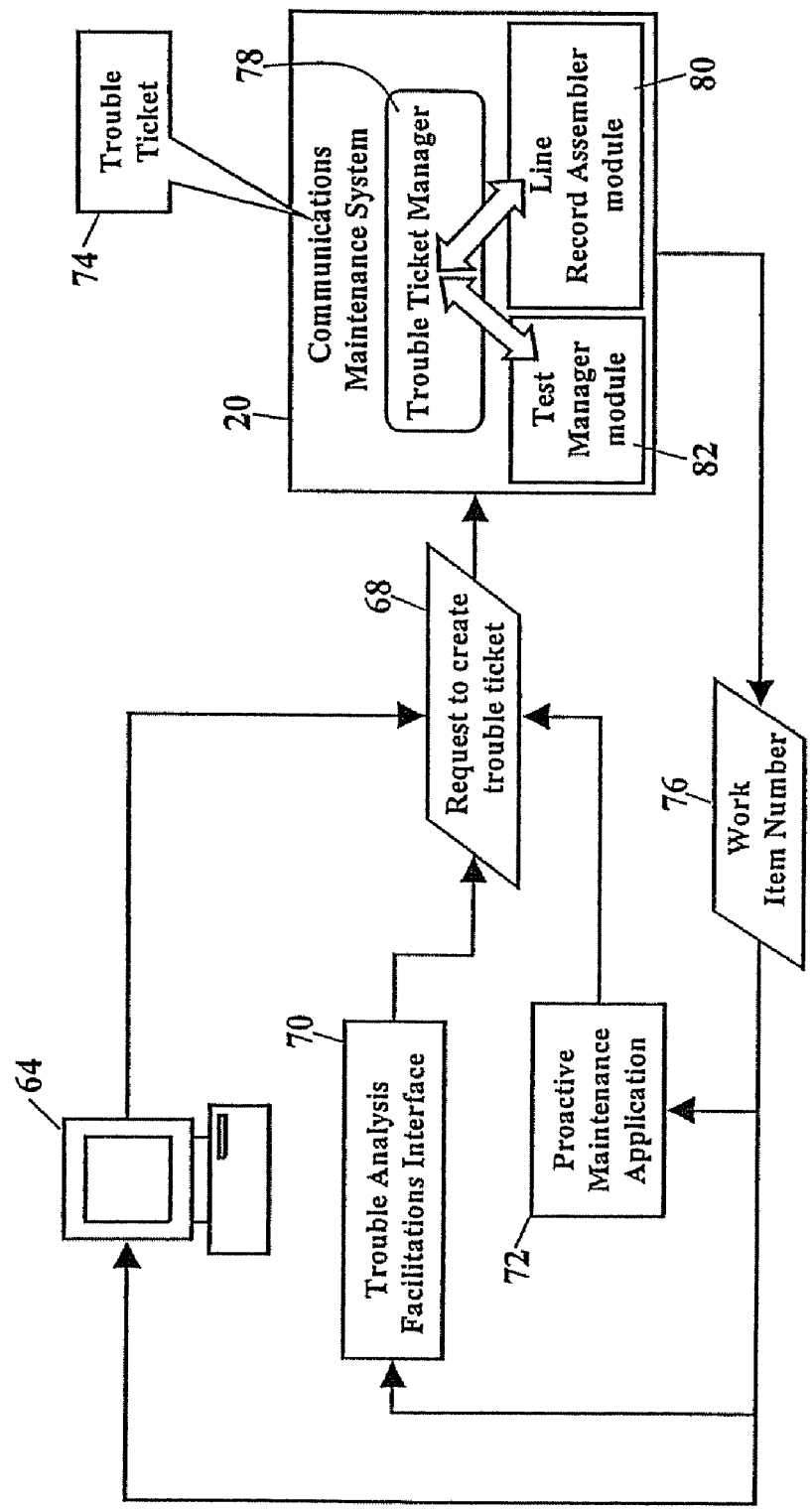
FIG. 4 is a schematic drawing of another embodiment of the Communications Maintenance System.

FIG. 4 is a schematic drawing of another embodiment of the Communications Maintenance System 20. Here the Communications Maintenance System 20 includes several process module. Each process module performs a specialized function or task that enhances the creation and the management of trouble tickets and of work orders. The Communications Maintenance System 20 includes a Trouble Ticket Manager 78, a Line Record Assembler module 80, and a Test Manager Module 82. The Trouble Ticket Manager 78 receives the request 68 to create a trouble ticket. The Trouble Ticket Manager 78, in response, creates the trouble ticket 74 and returns the work item number 76 to the requestor. The Trouble Ticket Manager 78 then interfaces with the Line Record Assembler module 80 and the Test Manager Module 82 to manage the trouble ticket 74 from creation to final closure.

Figure 5:
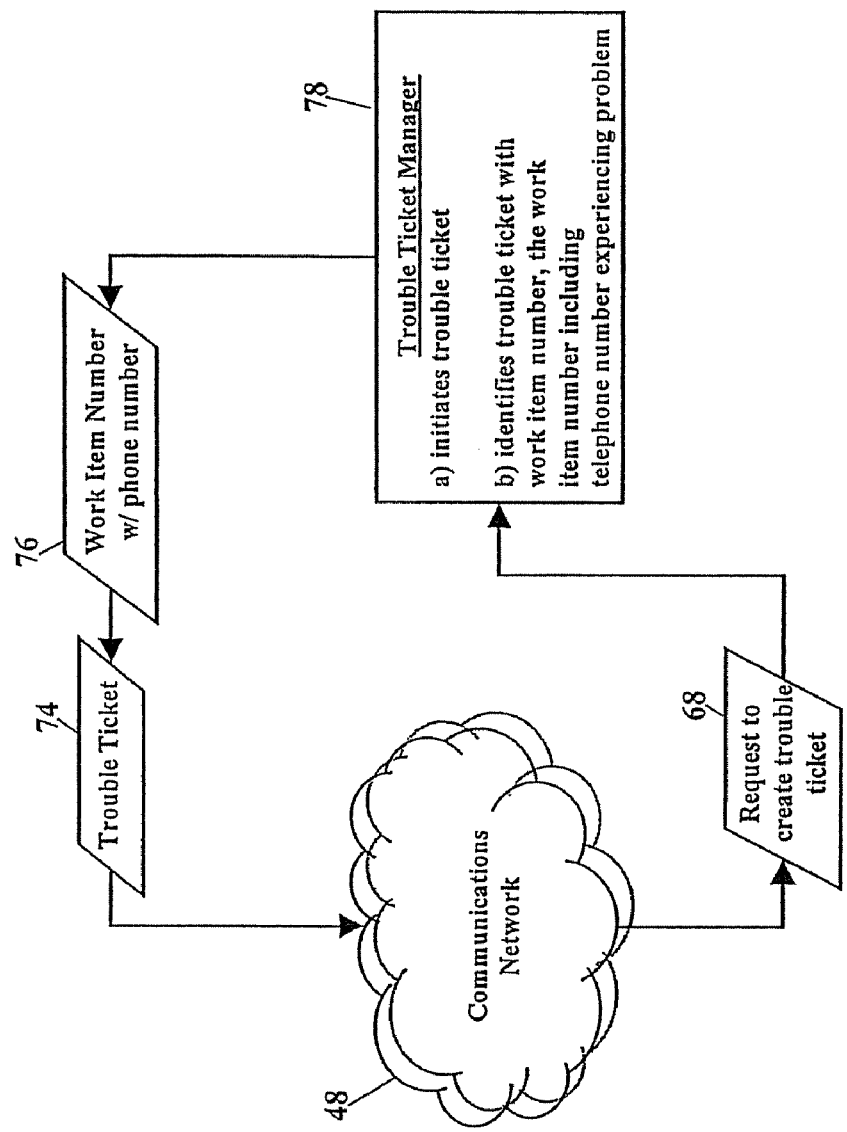
FIG. 5 is a schematic drawing of an embodiment of a Trouble Ticket Manager.

FIG. 5 is a schematic drawing of an embodiment of the Trouble Ticket Manager 78. The Trouble Ticket Manager 78 receives the request 68 to create a trouble ticket. The Trouble Ticket Manager 78, in response, creates the trouble ticket 74 and returns the work item number 76 to the requestor. The work item number 76 comprises a telephone number experiencing the problem. The Trouble Ticket Manager 78 communicates the trouble ticket 74, with the work item number 76, to the communications network 48 for distribution. The Trouble Ticket Manager 78 thus identifies and tracks the trouble ticket 74 using a customer's telephone number. The Trouble Ticket Manager 78 is more fully shown and described in U.S. application Ser. No. 09/946398, filed concurrently herewith, entitled PROCESSES AND SYSTEMS FOR CREATING AND FOR MANAGING TROUBLE TICKETS AND WORK ORDERS, and incorporated herein by reference in its entirety.

Figure 6:
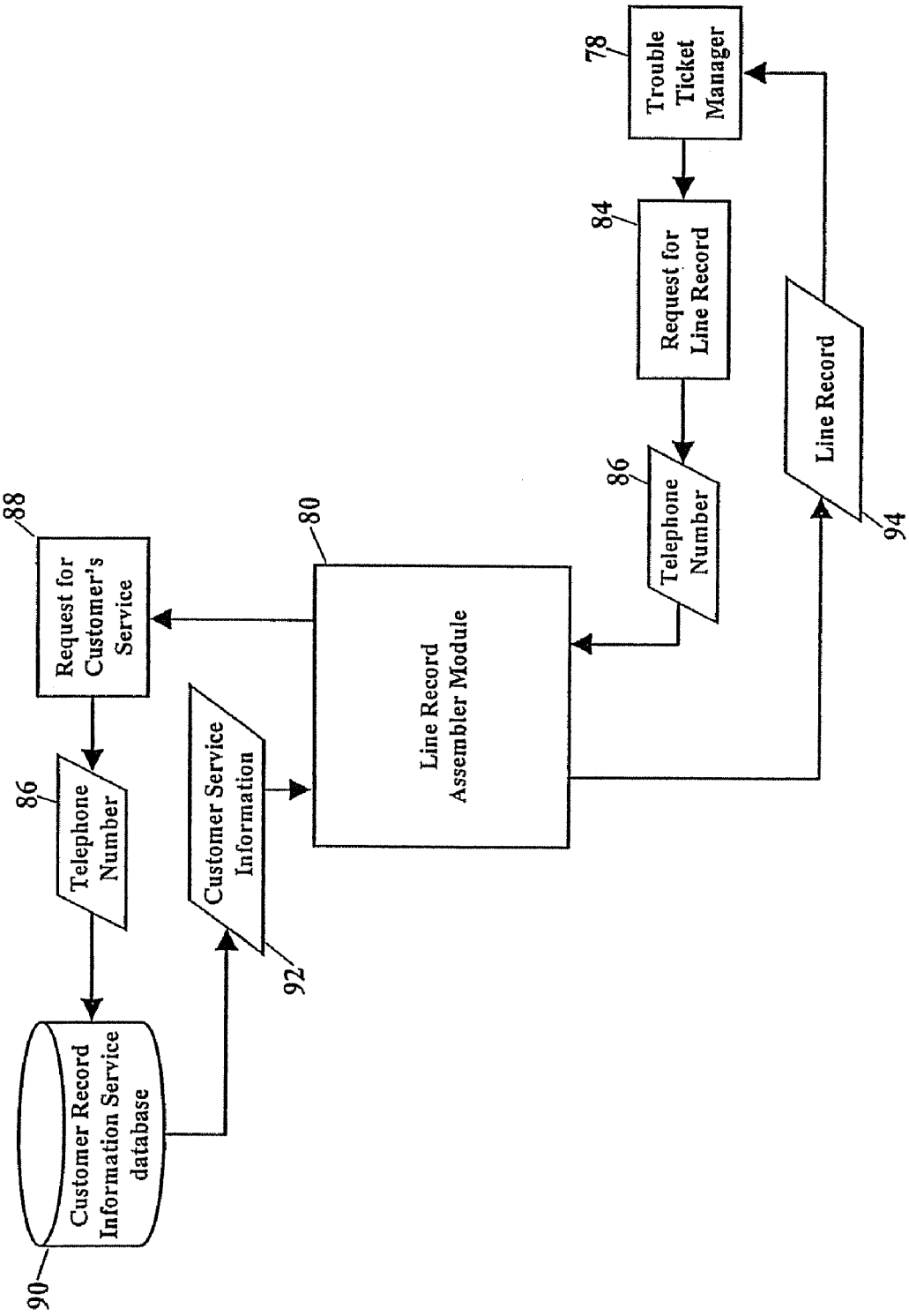
FIGS. 6-8 are schematic diagrams showing embodiments of a Line Record Assembler module.
Figure 7:
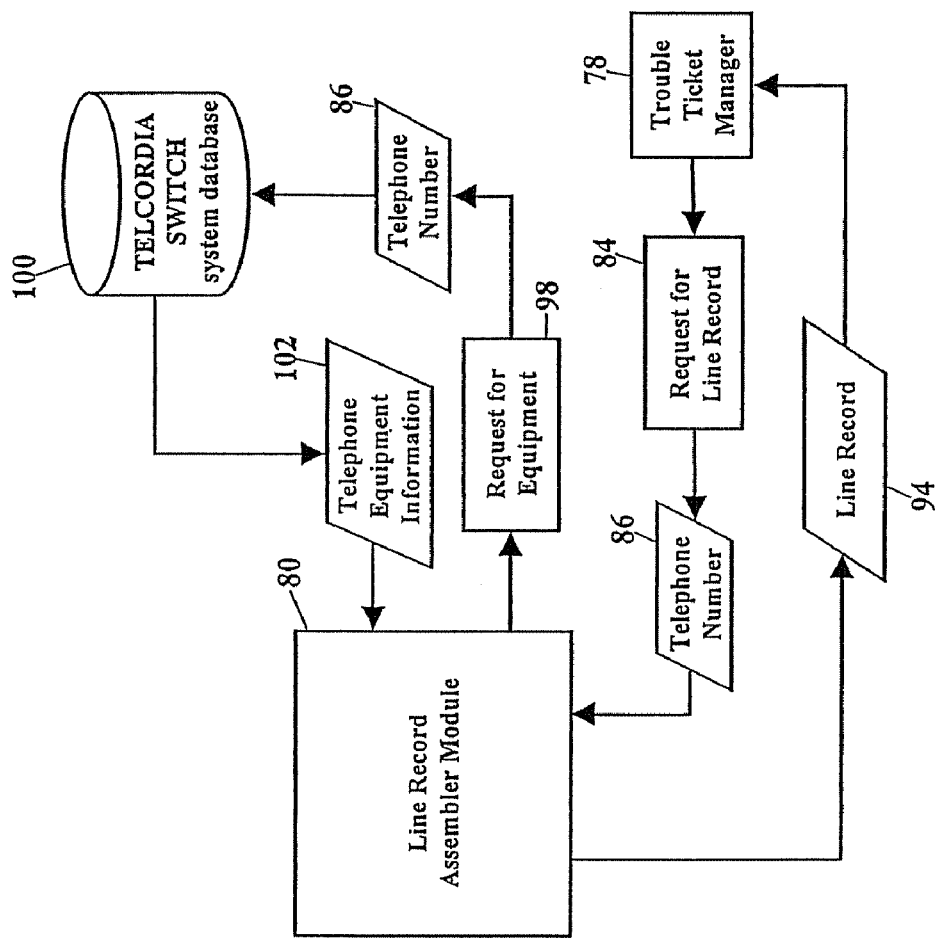
Figure 8:
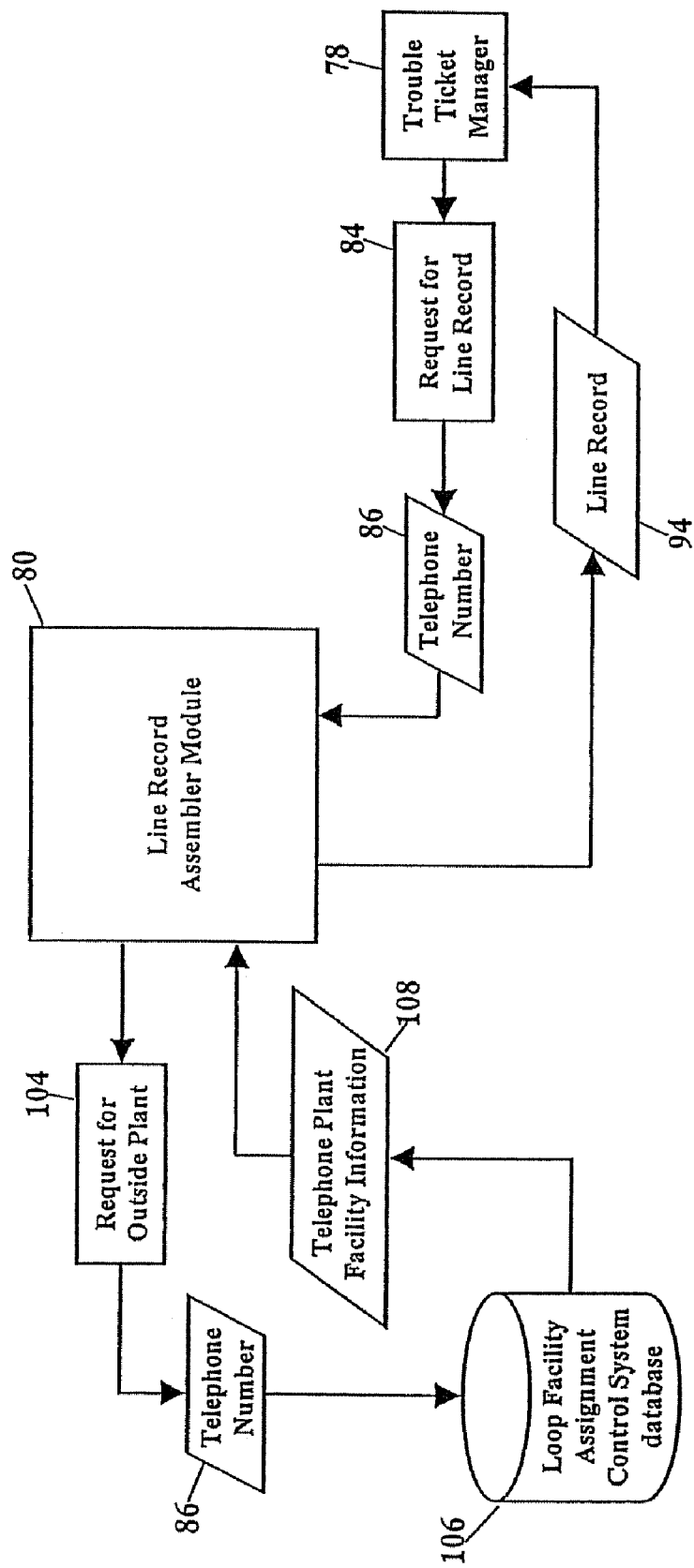

FIGS. 6-8 are schematic diagrams showing embodiments of the Line Record Assembler module 80. The Line Record Assembler module 80 constructs a line record for a telephone number. As FIG. 6 illustrates, the Trouble Ticket Manager 78 issues a request 84 for a line record. The request 84 for the line record is communicated over the communications network (shown as reference numeral 48 in FIGS. 2 and 5) to the Line Record Assembler module 80. The request 84 for the line record also contains information representing a telephone number 86 for which the line record is sought. The Line Record Assembler module 80 receives the request 84 for the line record, containing the information representing the telephone number 86, and then requests information to construct the line record. The Line Record Assembler module 80, however, is only briefly described; the Line Record Assembler module 80 is more fully shown and described in U.S. application Ser. No. 09/946405, filed concurrently herewith, entitled PROCESSES AND SYSTEMS FOR ASSEMBLING TELEPHONE LINE RECORDS, and incorporated herein by reference in its entirety.

FIG. 6 shows the Line Record Assembler module 80 retrieving customer information. When the Trouble Ticket Manager 78 issues the request 84 for a line record, the Line Record Assembler module 80 issues a request 88 for the customer's service. This request 88 for the customer's service also contains the telephone number 86 for which the customer's service information is sought. The request 88 for the customer's service is communicated over the communication network (shown as reference numeral 48 in FIG. 2) to a Customer Record Information System (CRIS) database 90. The Customer Record Information System database 90 retrieves customer service information 92 associated with the telephone number 86. The Line Record Assembler module 80 acquires the customer service information 92, stores the customer service information 92, and then assembles a line record 94 containing the customer service information 92. The line record 94 is returned to the Trouble Ticket Manager 78.

FIG. 7 is a schematic diagram showing the Line Record Assembler module 80 further constructing the line record 94. Here, however, the Line Record Assembler module 80 acquires telephone equipment information. The Line Record Assembler module 80, again, receives the request 84 for the line record, containing the information representing the telephone number 86, and then issues a request 98 for equipment associated with the telephone number 86. The request 98 for equipment is communicated over the communication network (shown as reference numeral 48 in FIG. 2) to a TELCORDIA™ SWITCH™ system database 100 (TELCORDIA™ and SWITCH™ are trademarks of Telcordia Technologies, Inc., 445 South St., Morristown N.J. 07960, www.telcordia.com). The TELCORDIA™ SWITCH™ system database 100 retrieves telephone equipment information 102 associated with the telephone number 86. The telephone equipment information 102 describes what telephone equipment is associated with the telephone number 86. The Line Record Assembler module 80 acquires the telephone equipment information 102, stores the telephone equipment information 102, and then assembles the line record 94 containing the telephone equipment information 102.

FIG. 8 is a schematic diagram showing a further embodiment of the Line Record Assembler module 80. The Line Record Assembler module 80 receives the request 84 for the line record, containing information representing the telephone number 86, and then issues a request 104 for outside plant facility information associated with the telephone number 86. The request 104 for outside plant facility information is communicated over the communication network (shown as reference numeral 48 in FIG. 2) to a Loop Facility Assignment Control System (LFACS) 106. The Loop Facility Assignment Control System 106 retrieves telephone plant facility information 108 associated with the telephone number 86. The Line Record Assembler module 80 acquires the telephone plant facility information 108, stores the telephone plant facility information 108, and then assembles the line record 94 containing the telephone plant facility information 108.

Figure 9:
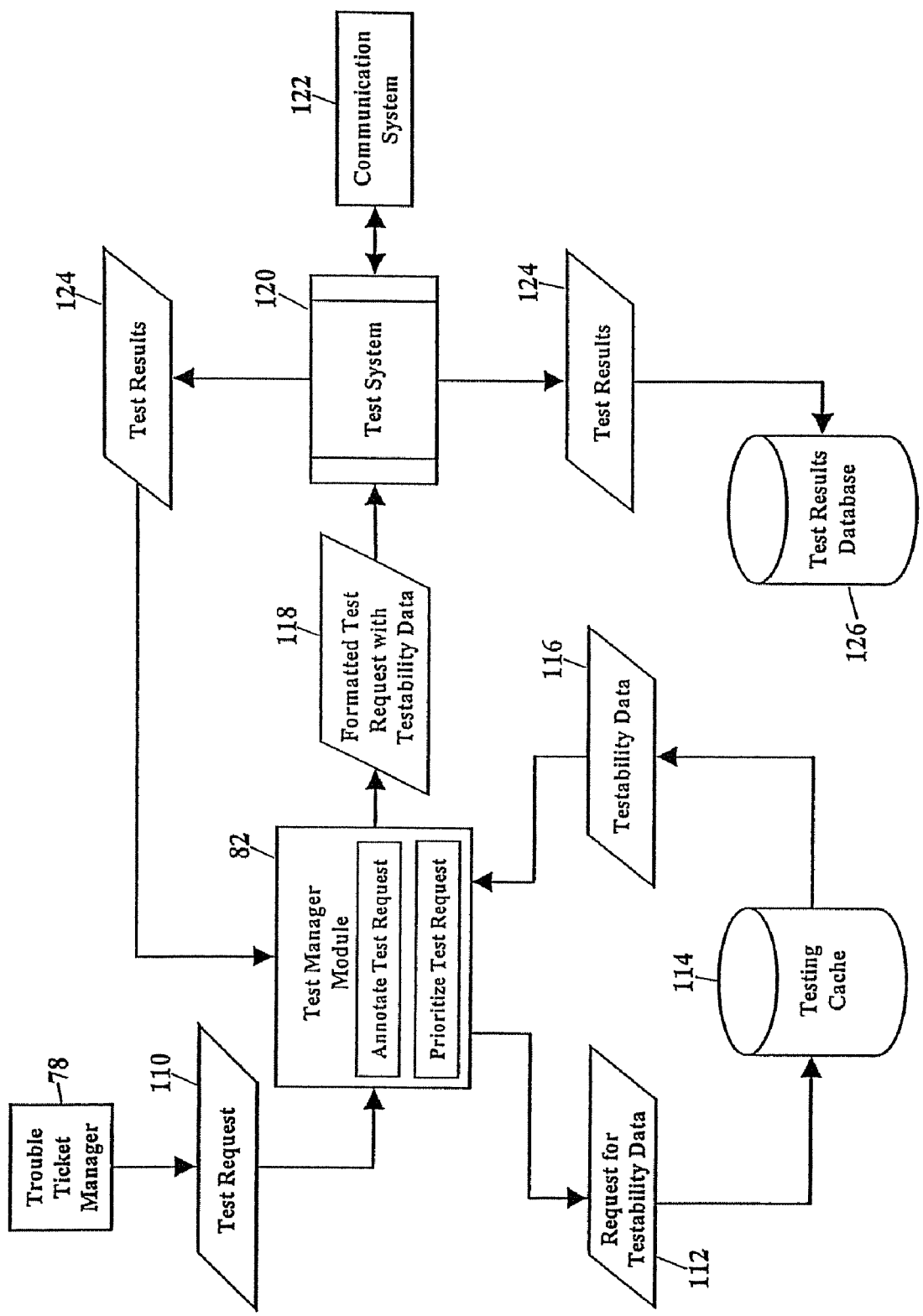
FIG. 9 is a schematic diagram showing one embodiment of a Test Manager module.

FIG. 9 is a schematic diagram showing one embodiment of the Test Manager module 82. The Test Manager module 82 communicates with the communications network (shown as reference numeral 48 in FIG. 2) and acquires a test request 110 from the Trouble Ticket Manager 78. The Test Manager module 82 annotates the test request with at least one of a date, a time, and the originating user or system of the test request 110. If the test request 110 requires testability data, a request 112 for testability data is communicated along the communications network to a testing cache 114. If the testing cache 114 contains the requested information, the Test Manager module 82 communicates with the communications network and acquires testability data 116. The Test Manager module 82 formats the test request 110 with the testability data 116 and sends a formatted test request 118 to a test system 120. The test system 120 performs the requested test of a telecommunications system 122 and acquires test results 124. The Test Manager module 82 communicates with the communications network and acquires the test results 124. The test results 124 may also be stored in a test results database 126 for quick retrieval at a later time. The Test Manager module 82 then distributes the test results 124 along the communications network. The Test Manager module 82 is more fully shown and described in U.S. application Ser. No. 09/946266, filed concurrently herewith, entitled PROCESSES AND SYSTEMS FOR MANAGING TESTING OF COMMUNICATIONS SYSTEMS, and incorporated herein by reference in its entirety.

Figure 10:
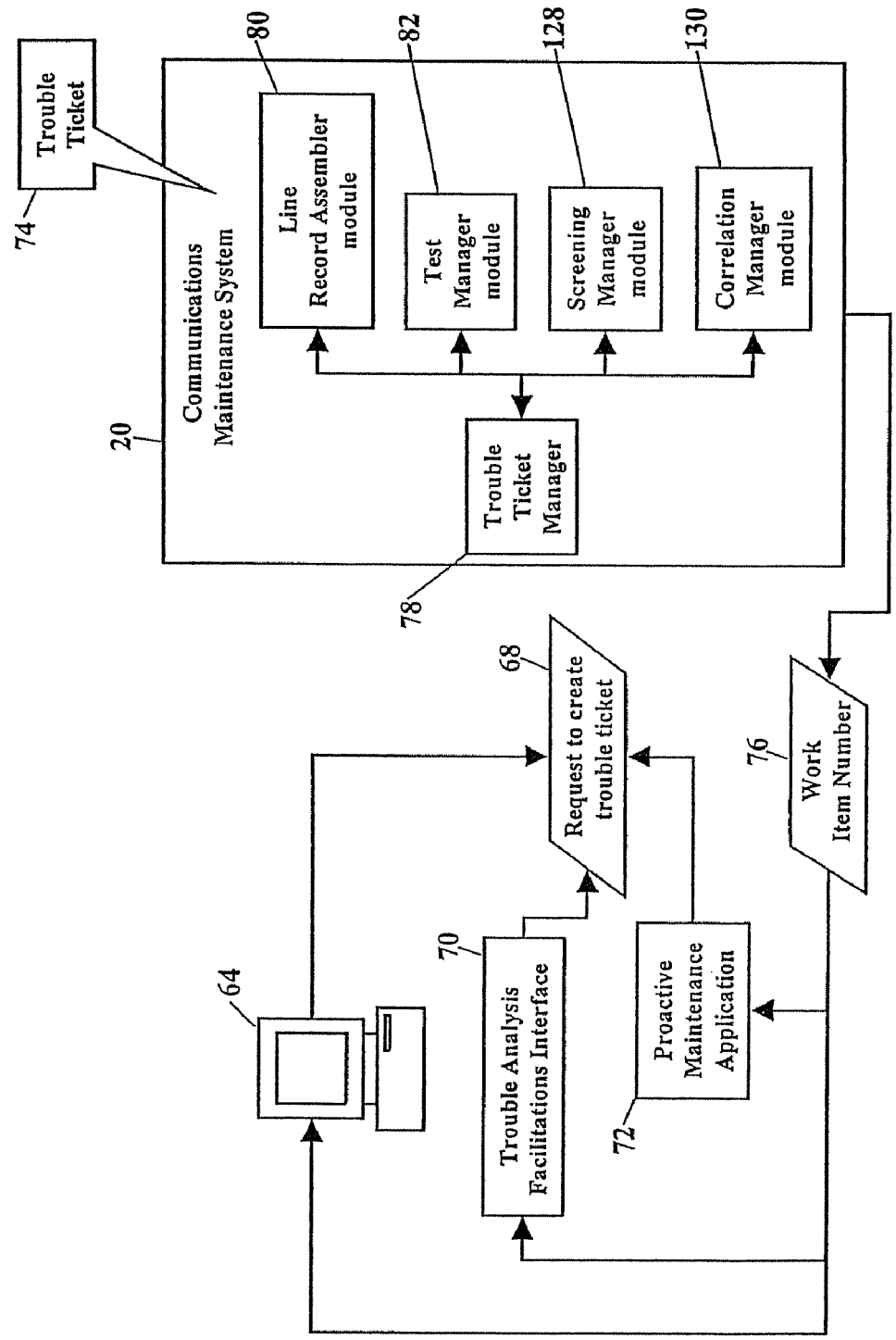
FIG. 10 is a schematic diagram of another embodiment of the Communications Maintenance System.

FIG. 10 is a schematic drawing of another embodiment of the Communications Maintenance System 20. The Communications Maintenance System 20 includes the Trouble Ticket Manager 78, the Line Record Assembler module 80, and the Test Manager Module 82. FIG. 10, however, also shows a Screening Manager module 128 and a Correlation Manager module 130. The Trouble Ticket Manager 78 receives the request 68 to create a trouble ticket, creates the trouble ticket 74, and returns the work item number 76 to the requestor. The Trouble Ticket Manager 78 identifies and tracks the trouble ticket 74, the Line Record Assembler module 80 constructs the line record (shown as reference numeral 94 in FIGS. 6-8), and the Test Manager Module 82 manages test requests.

Figure 11:
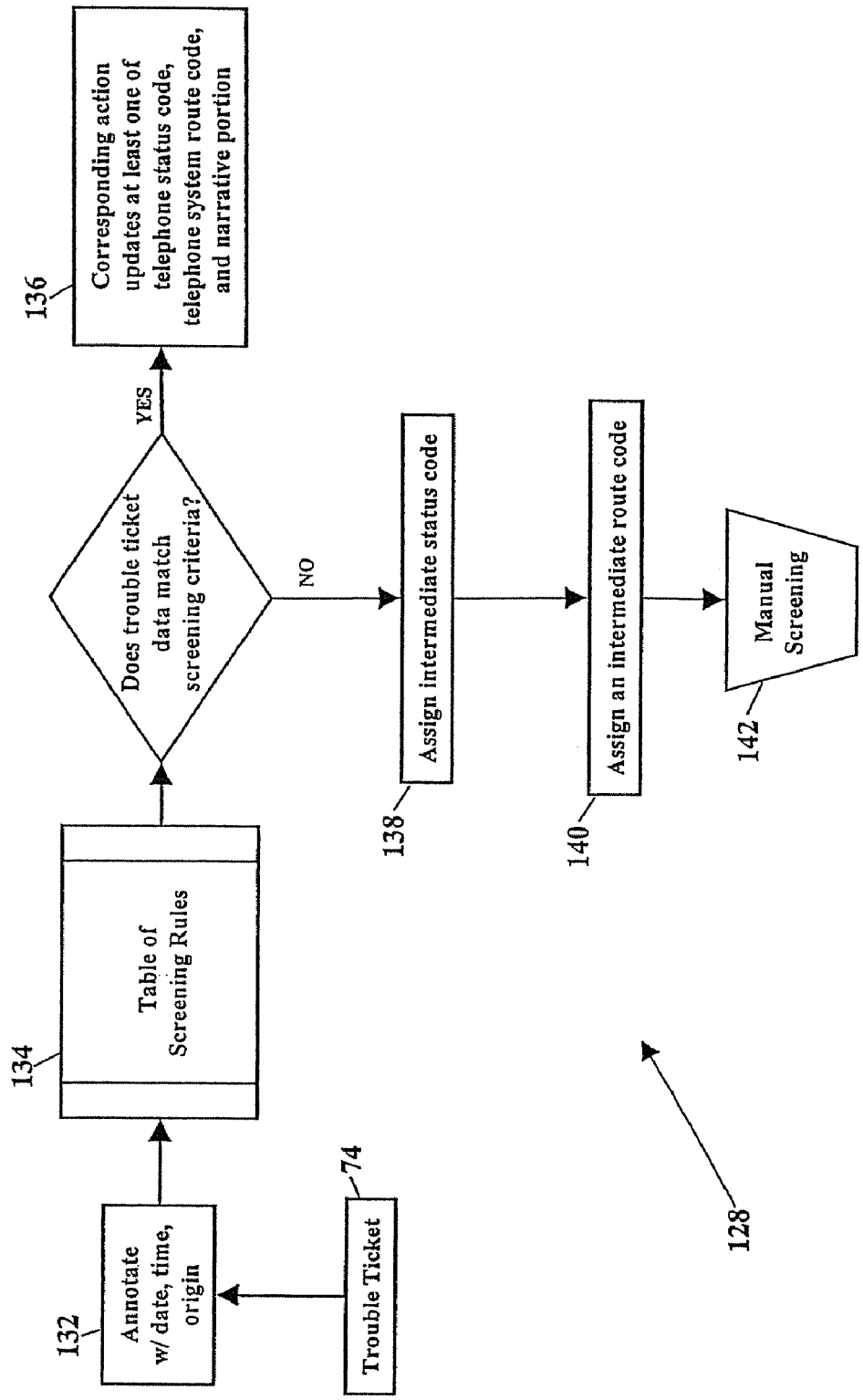
FIG. 11 is a flowchart showing one embodiment of a Screening Manager module.

FIG. 11 is a flowchart showing one embodiment of the Screening Manager module 128. The Screening Manager module 128 screens the trouble ticket 74 for known indications of trouble in the telecommunications system. The trouble ticket 74 is annotated 132 with at least one of a date, a time, and an origin of the trouble ticket 74. The annotated trouble ticket 74 is then filtered using a table 134 of screening rules. The table 134 of screening rules contains at least one user-defined screening criteria and a corresponding action. If the trouble ticket 74 contains data that matches the screening criteria, then the Screening Manger module 128 updates 136 the trouble ticket 74 according to the corresponding action. The corresponding action updates at least one of a telephone status code, a telephone system route code, and a narrative portion of the trouble ticket 74. The table 134 of screening rules may thus be used to filter the trouble ticket 74 for known trouble codes or for other definable criteria. The Screening Manger module 128 is more fully shown and described in U.S. application Ser. No. 09/946269, filed concurrently herewith, entitled PROCESSES AND SYSTEMS FOR SCREENING WORK ORDERS, and incorporated herein by reference in its entirety.

If the screening criteria is not found, then the trouble ticket 74 may require manual screening. If the trouble ticket 74 does not contain data that matches the screening criteria, then the Screening Manager module 128 may assign a specific status code 138 and may assign a specific route code 140. These exception cases, where no rules apply and, thus, no action is taken, could then be manually screened 142 using human analysis. Manual screening, however, would still update the telephone status code, the telephone system route code, and the narrative portion of the trouble ticket 74. Even a manually screened trouble ticket 74, therefore, would still be filtered for known indications of trouble.

Figure 12:
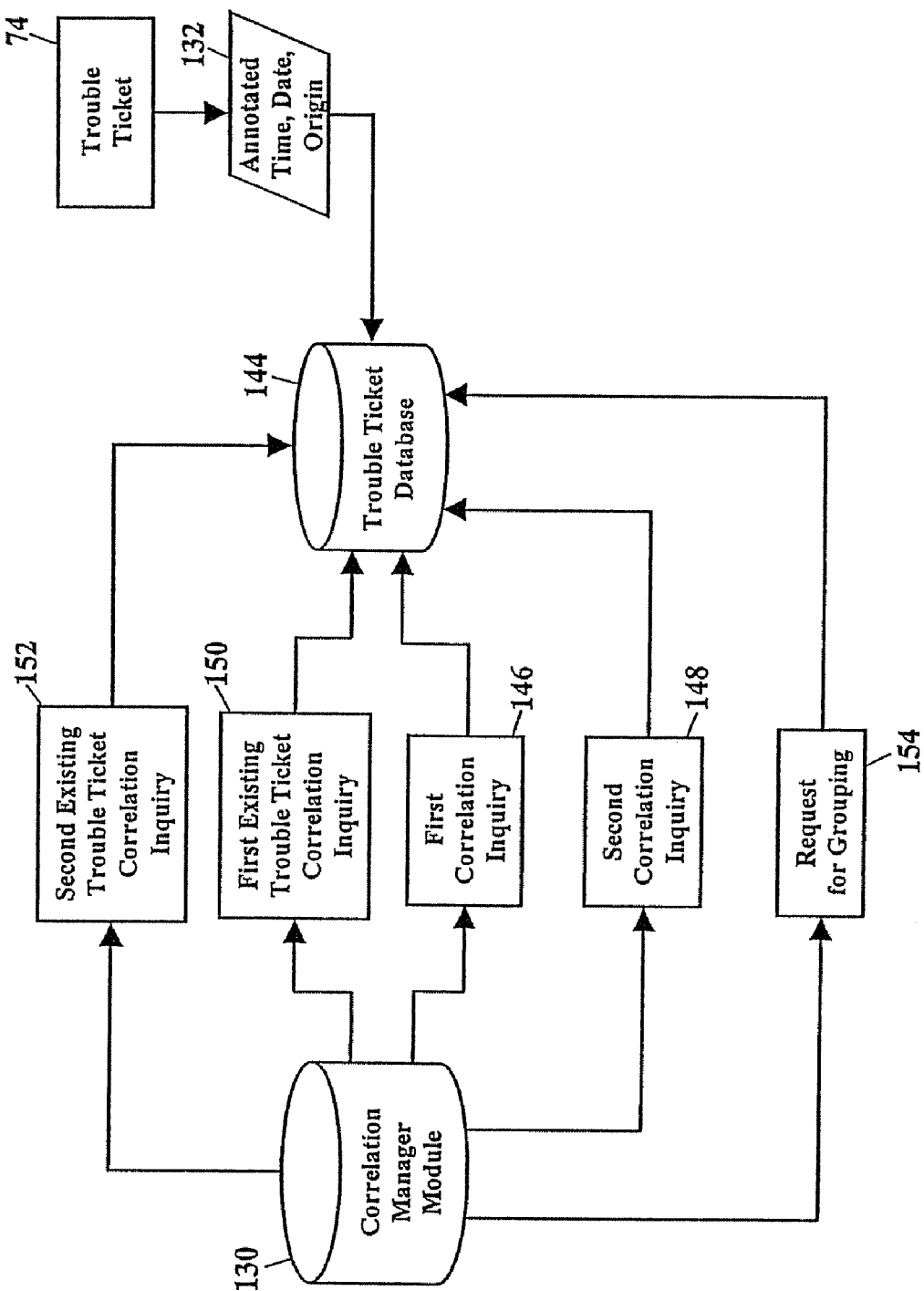
FIG. 12 is a block diagram showing one embodiment of a Correlation Manager module.

FIG. 12 is a block diagram showing one embodiment of the Correlation Manager module 130. The Correlations Manager module 130 correlates and groups both open and closed trouble tickets. FIG. 12 shows the trouble ticket 74, including the annotated date, time, and origin 132, is communicated over the communications network to a trouble ticket database 144. The trouble ticket database 144 stores the trouble ticket 74 with previously-created, open trouble tickets. The Correlation Manager module 130 is only briefly described; the Correlation Manager module 130 is more fully shown and described in U.S. application Ser. No. 09/946272, filed concurrently herewith, entitled PROCESSES AND SYSTEMS FOR CORRELATING WORK ORDERS, and incorporated herein by reference in its entirety.

The Correlation Manager module 130 then requests searches. The Correlation Manager module 130 correlates the trouble ticket 74 with existing trouble tickets according to at least one correlation parameter. The Correlation Manager module 130 communicates with the communications network and inquires whether the trouble ticket 74 contains the at least one correlation parameter. A first correlation inquiry 146, for example, inquires whether the trouble ticket 74 contains a first predetermined correlation parameter. A second correlation inquiry 148 inquires whether the trouble ticket 74 contains a second predetemrined correlation parameter. If the trouble ticket 74 contains the at least one correlation parameter, then the Correlation Manager module 130 requests a search of existing trouble tickets that also contain the at least one correlation parameter. A first existing trouble ticket correlation inquiry 150, and a second existing trouble ticket correlation inquiry 152, inquiries whether any existing trouble tickets also contain the first and second correlation parameters. While only the first correlation parameter and the second correlation parameter are discussed, those of ordinary skill in the art now recognize more than two correlation parameters may be chosen.

The Correlation Manager module 130 then requests groupings of trouble tickets. If an existing trouble ticket contains both the first and second correlation parameters, the Correlation Manger module 130 then communicates a request for grouping 154. The Correlation Manager module 130 requests that the trouble ticket 74 be grouped with any existing trouble tickets that share the first and second correlation parameters. The Correlation Manager module 130 may even further request that the trouble ticket 74 be grouped with any existing trouble tickets that share annotated date and time stamps. The Correlation Manager module 130 may alternatively request groupings of trouble tickets that have annotated date and time stamps within a predetermined interval.

Figure 13:
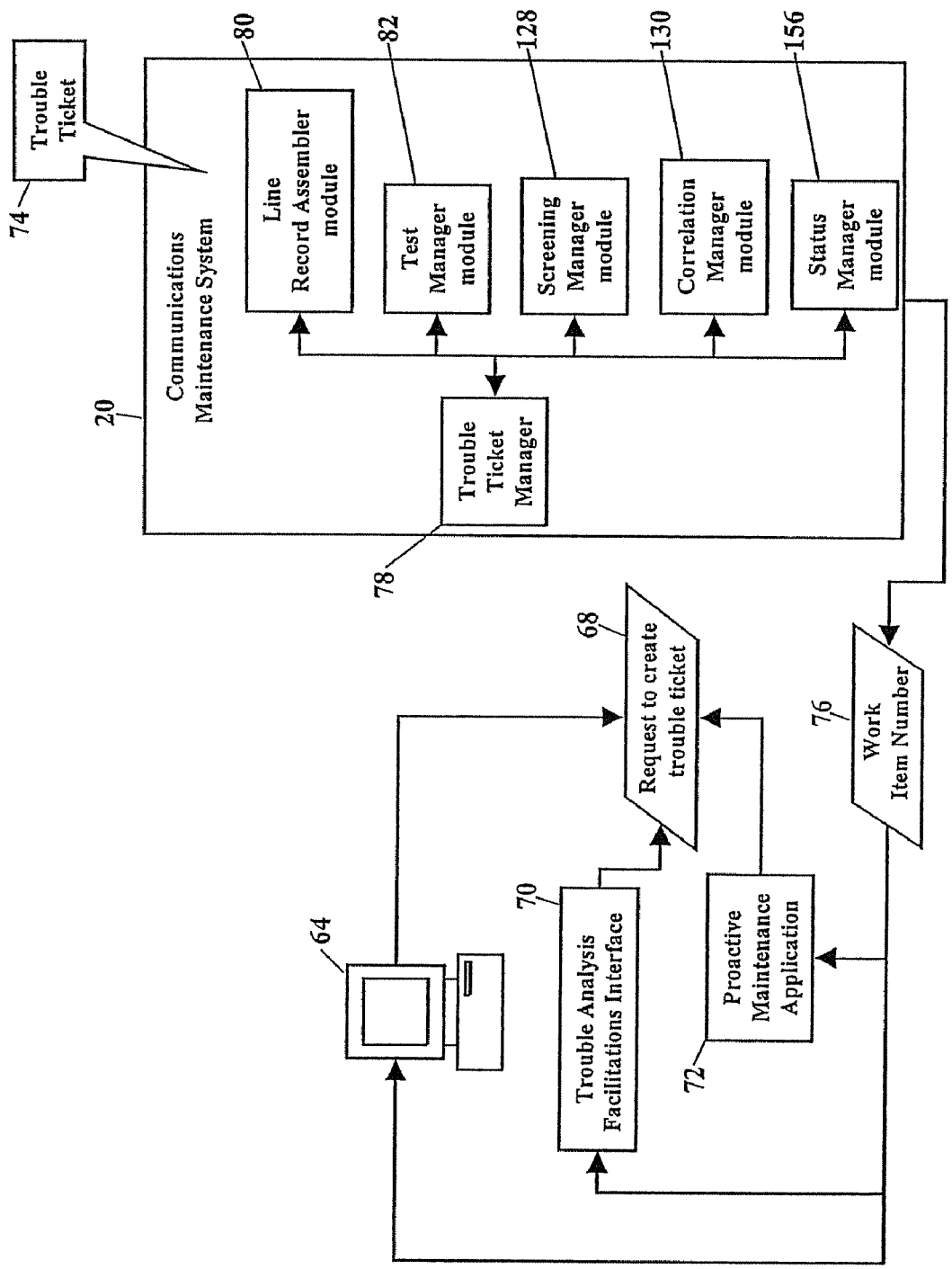
FIG. 13 is a schematic drawing of a further embodiment of the Communications Maintenance System.

FIG. 13 is a schematic drawing of a further embodiment of the Communications Maintenance System 20. The Communications Maintenance System 20 may include a Status Manger module 156. The Status Manager module 156 tracks and logs each change in status to work orders or to trouble tickets. The Status Manager 156 module, for example, tracks every activity during the life of the trouble ticket 74. Whether the trouble ticket 74 is assigned to a manual inspection process, or whether the trouble ticket 74 passes to a dispatch status, the Status Manger module 156 tracks this progress. If the trouble ticket 74 is being worked by a technician, the Status Manager module 156 would note the technician status and, also, date and time stamp the assignment. The Status Manager module 156 tracks who has touched the trouble ticket 74, who has deferred action on the trouble ticket 74, who has referred the trouble ticket 74 to another party or activity, who has transitioned the trouble ticket 74, and any other activity occurring during the life of the trouble ticket 74. The Status Manager module 156, therefore, tracks, brokers, and manages all the status details that occur as the trouble ticket 74 progresses from creation to final closure.

Figure 14:
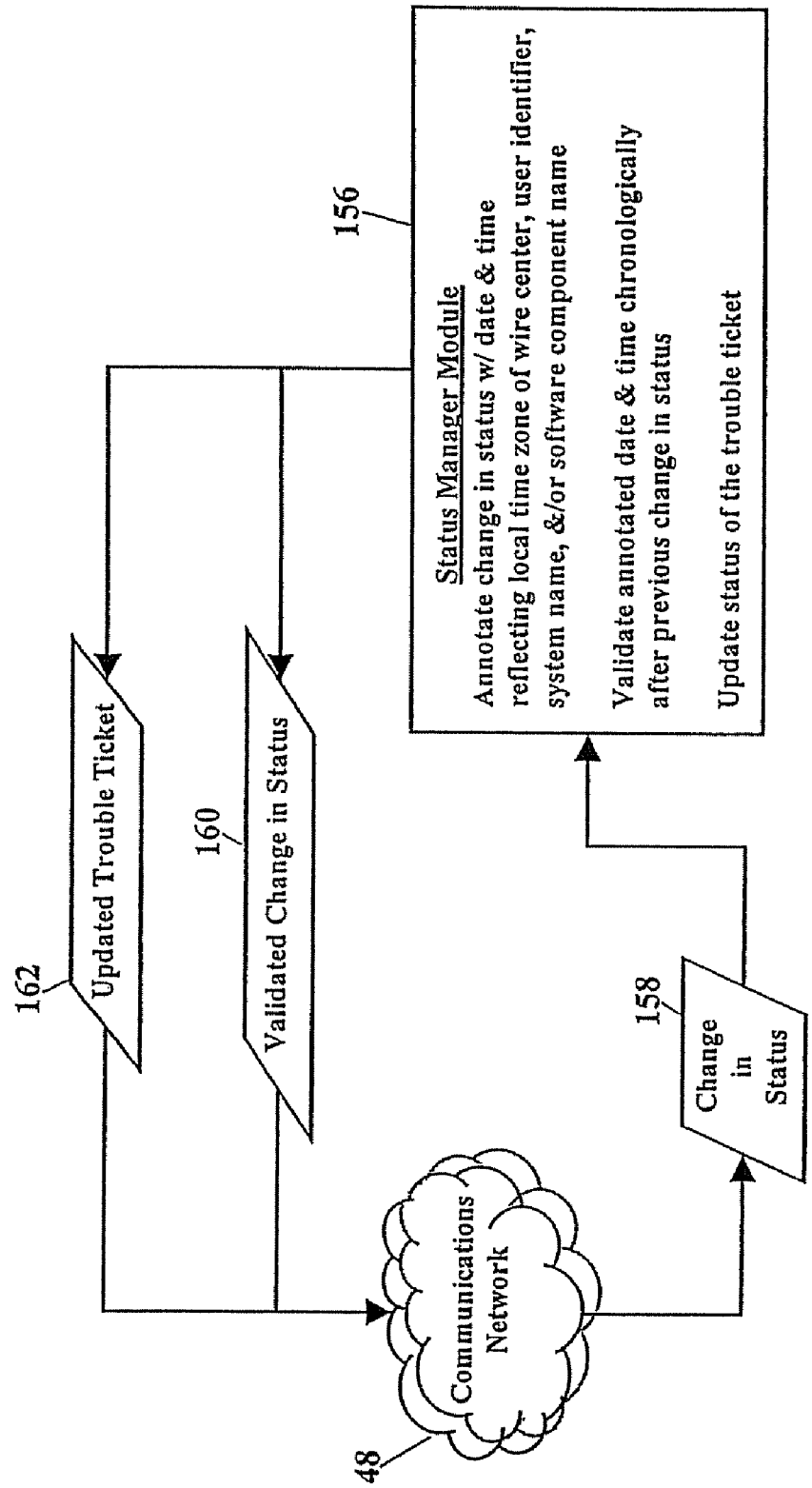
FIG. 14 is a schematic drawing of one embodiment of a Status Manager module.

FIG. 14 is a schematic drawing of one embodiment of the status Manager module 156. The Status Manager module 156 communicates with the communications network 48 and receives a change in status 158 to the trouble ticket (shown as reference numeral 74 in FIG. 13). The Status Manager module 156 annotates the change in status 158 with a date and a time. The date and the time reflect the local time zone of a telephone system wire center where the trouble ticket is locally managed. This embodiment validates that the annotated date and the time are chronologically after a previous change in status to the trouble ticket. The status of the trouble ticket is then updated. The Status Manager module 156 may then communicate a validated change in status 160 to the communications network 48 for distribution to client systems and to users. The Status Manager module 156 could also communicate an updated trouble ticket 162 to the communications network 48. The updated trouble ticket 162 could reflect the validated change in status 160. The Status Manager module 156 is more fully shown and described in U.S. application Ser. No. 09/946270, filed concurrently herewith, entitled PROCESSES AND SYSTEMS FOR MANAGING STATUS CHANGES TO WORK ORDERS, and incorporated herein by reference in its entirety.

Figure 15:
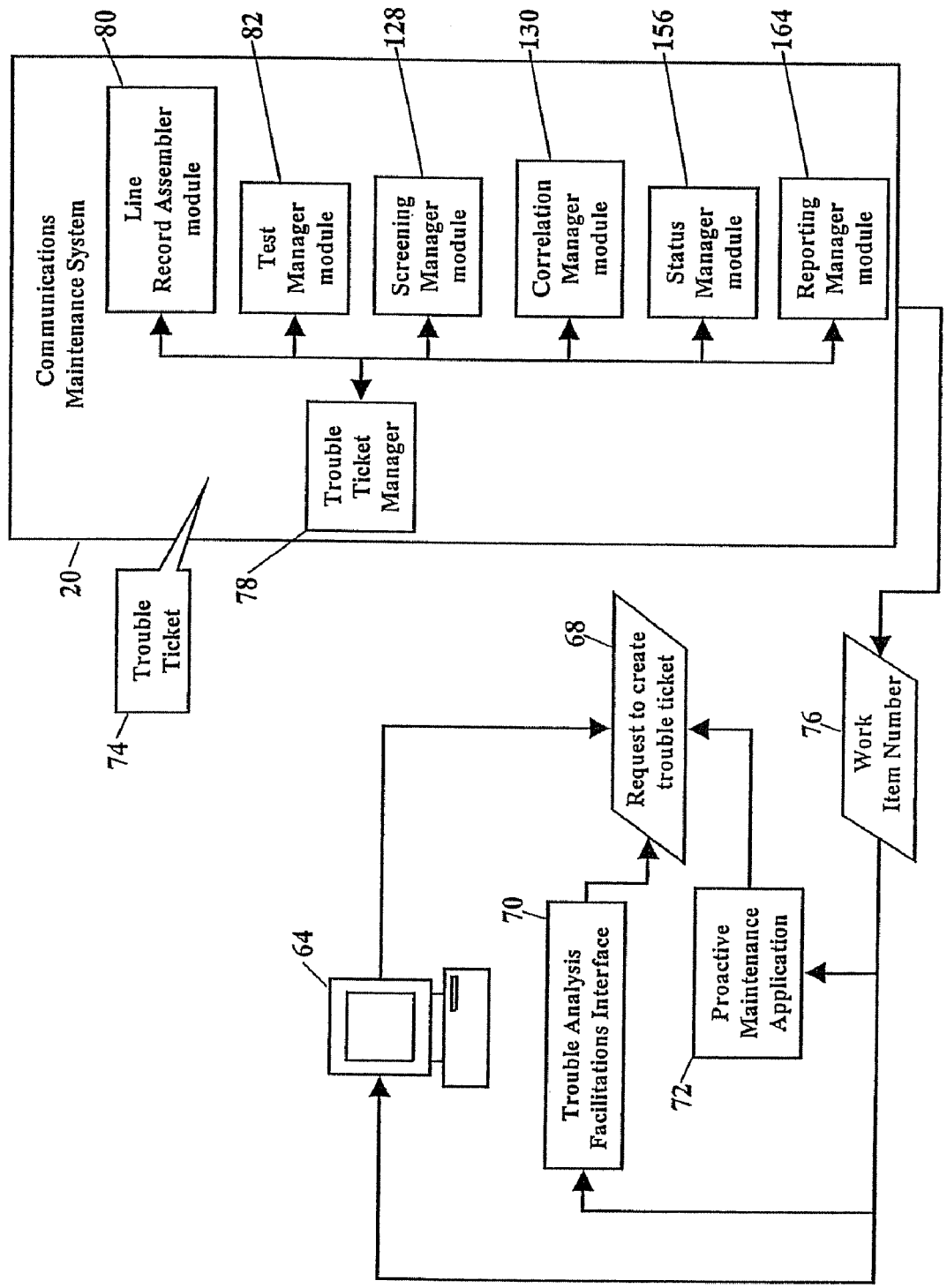
FIG. 15 is a schematic drawing of still another embodiment of the Communications Maintenance System.

FIG. 15 is a schematic drawing of still another embodiment of the Communications Maintenance System 20. This embodiment of the Communications Maintenance System 20 includes a Reporting Manager module 164. The Reporting Manager module 164 prepares detailed maintenance reports for management and for government regulators. The Reporting Manger module 164 creates and generates these maintenance reports using real-time, up-to-date information. Maintenance reports, therefore, more accurately reflect the condition of a telecommunication system. Managers have a more accurate view of the performance of field technicians and of maintenance crews. Governmental regulators also have a more accurate measurement of how well customers are treated and how fast customer problems are resolved. The Reporting Manager module 164, therefore, helps managers attain internal performance objectives and meet, or exceed, regulatory requirements.

Figure 16:
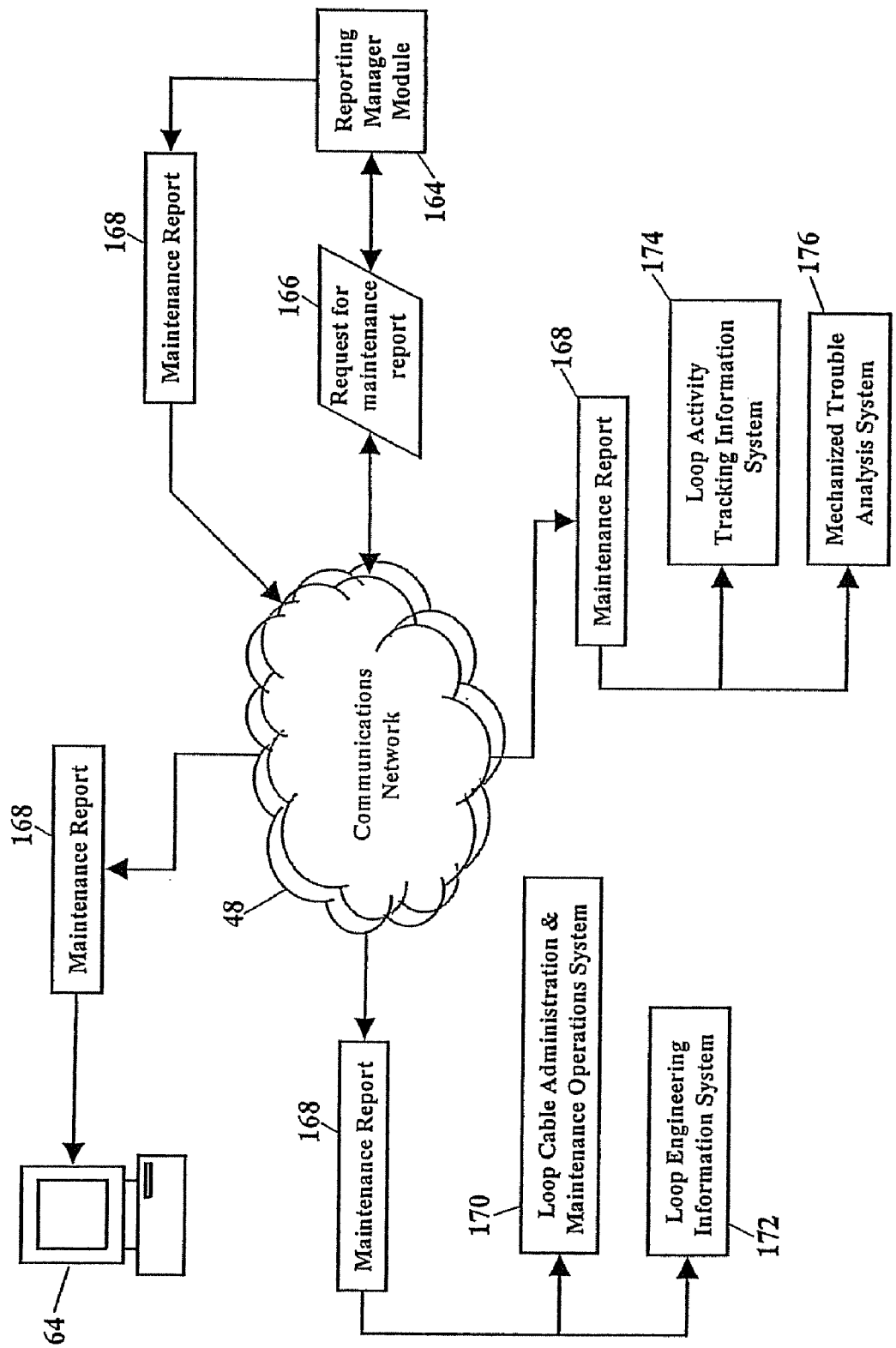
FIG. 16 is a schematic drawing showing one embodiment of a Reporting Manager module.

FIG. 16 is a schematic drawing showing one embodiment of the Reporting Manager module 164. The Reporting Manager module 164 receives a request 166 for a maintenance report. The Reporting Manager module 164 then prepares, formats, and distributes a maintenance report 168. The Reporting Manager module 164 may, for example, send the maintenance report 168 to the communications network 48 for distribution to clients. The user at the user computer 64, for example, may request and receive the maintenance report 168. The maintenance report 168 may also be prepared for many reporting systems used within the telecommunications industry. These reporting systems include a Loop Cable Administration and Maintenance Operations System (LCAMOS) 170 (more commonly referred to as "Predictor"), a Loop Engineering Information System (LEIS) 172, a Loop Activity Tracking Information System (LATIS) 174, and a Mechanized Trouble Analysis System (MTAS) 176. Because the maintenance report 168 is composed of the freshest data available, each of these reporting systems provides managers, users, the Federal Communications Commission, state and local utilities commission, and others with an up-to-date, accurate picture of the communications system. The Reporting Manager module 164 is more fully shown and described in U.S. application Ser. No. 09946397, filed concurrently herewith, entitled PROCESSES AND SYSTEMS FOR CREATING MAINTENANCE REPORTS FOR COMMUNICATIONS SYSTEMS, and incorporated herein by reference in its entirety.

The Communications Maintenance System 20 may be physically embodied on or in a computer-readable medium. This computer-readable medium may include a CD-ROM, DVD, tape, cassette, floppy disk, memory card, and a large-capacity disk (such as IOMEGA® ZIP®, JASS®, and other large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the Communications Maintenance System 20 to be easily disseminated. A computer program product would include the computer-readable medium and at least one of the following modules stored on the computer-readable medium: a Trouble Ticket Manager for creating and for managing trouble tickets, a Line Record Assembler module for assembling telephone line records, a Test Manager module for managing test requests of the telecommunications system, a Correlation Manager module for correlating similar trouble tickets, a Screening Manager module for isolating the trouble with the telecommunications system, a Status Manager module for managing status changes to the trouble ticket, and a Reporting Manager module for generating maintenance reports describing the status of the trouble ticket.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A process for creating and for managing a trouble ticket, the trouble ticket describing a problem in a telecommunications system, the process comprising:

communicating with a communications network and receiving a request to create the trouble ticket;

creating the trouble ticket to investigate the problem with the telecommunications system;

assigning a work item number to the trouble ticket, and work item number comprising a telephone number experiencing the problem with the telecommunications system; and tracking the trouble ticket, from initial creation to final closure, using the assigned work item number;

screening the trouble ticket for known indications of the problem in the telecommunications system, wherein screening the trouble ticket includes filtering the trouble ticket for a screening criteria, the screening criteria having a corresponding action;

updating the trouble ticket according to the corresponding action, the corresponding action updating at least one of a telephone system status code, a telephone system route code, and a narrative portion describing the telecommunications system, whereby the process screens the trouble ticket for known indications of trouble in the telecommunications system.

2. The process for creating and for managing a trouble ticket according to claim 1 further comprising annotating the trouble ticket with information from a telephone line record.

3. The process for crating and for managing a trouble ticket according to claim 1, further comprising annotating the trouble ticket with information from a telephone line record, the information from the telephone line record comprising at least one of i) information associated with a customer's service, ii) facility information associated with the customer's service, and iii) information associated with equipment used by the customer.

4. The process for creating and for managing a trouble ticket according to a claim 1, further comprising annotating the trouble ticket with information from a telephone line record, the information from the telephone line record comprising at least one of i) customer information from a Customer Record Information System, ii) facility information from a Loop Facility Assignment Control System, and iii) equipment information form a TELCORDIA™ SWITCH system.

5. The process for creating and for managing a trouble ticket according to claim 1, further comprising communicating a test request for a test of the telecommunications system.

6. The process for creating and for managing a trouble ticket according to claim 5, further comprising formatting the test request with testability data desired by a test system.

7. The process for creating and for managing a trouble ticket according to claim 5, further comprising communicating with the communications network and acquiring results of a test of the telecommunications system.

8. The process for creating and for managing a trouble ticket according to claim 1, further comprising correlating the trouble ticket with tan existing trouble ticket that shares a similar characteristic, wherein the trouble ticket may be grouped with the existing trouble ticket to efficiently resolve related trouble tickets.

9. The process for creating and for managing a trouble ticket according to claim 1, further comprising annotating the trouble ticket with a date and time.

10. The process for creating and for managing a trouble ticket according to claim 9, further comprising correlating the trouble ticket with an existing trouble ticket that has an annotated date and time within a predetermined interval of an annotated date and time of the existing trouble ticket.

11. The process for creating and for managing a trouble ticket according to claim 1, further comprising searching the trouble ticket and a database of existing trouble tickets for at least one correlation parameter, and grouping the trouble tickets with an existing trouble ticket that shares the at least one correlation parameter and that shares a common designation of a telephone system wire center.

12. The process for creating and for managing a trouble ticket according to claim 1, further comprising assigning a telephone system status code to the trouble ticket.

13. The process for creating and for managing a trouble ticket according to claim 1, further comprising closing related, common cause trouble tickets.

14. The process for creating and for managing a trouble ticket according to claim 1, further comprising closing the trouble ticket when the problem with the telecommunications system is resolved.

15. The process for creating and for managing a trouble ticket according to claim 1, further comprising generating a maintenance report using information from the trouble ticket.

16. A computer program for managing a trouble ticket, the trouble ticket describing trouble with a telephone system local loop, the computer program comprising:

communicating with a communications network and receiving a request to create the trouble ticket;

acquiring information from a telephone line record to help resolve the trouble, the information from the telephone line record comprising at least one of i) customer information from a Customer Record Information System, ii) facility information from a Loop Facility Assignment Control System, and iii) equipment information from a TELCORDIA™ SWITCH system;

creating the trouble ticket to investigate the trouble with the telephone system local loop;

assignment a work item number to the trouble ticket, the work item number comprising a telephone number experiencing the trouble with the telephone system local loop;

screening the trouble ticket for known indications of the trouble with the telephone system local loop; wherein the screening the trouble ticket includes filtering the trouble ticket for a screening criteria, the screening criteria having a corresponding action;

updating the trouble ticket according to the corresponding action, the corresponding action updating at least one of a telephone system status code, a telephone system route code, and a narrative portion describing the telecommunications system, whereby the process screens the trouble ticket for known indications of trouble in the telecommunications system;

correlating the trouble ticket with an existing trouble ticket having a common characteristic and having a common designation of a wire center; and closing the trouble ticket when the trouble with the telephone system local loop is resolved.

17. A system for creating and for managing a trouble ticket, the trouble ticket describing a problem in a telecommunications system, the system comprising:

at least one processor capable of manipulating information to create and to manage the trouble ticket; and at least one of the following modules a Trouble Ticket Manager for creating and for managing trouble tickets, the trouble Ticket Manger communicating with a communications network and receiving a request to create the trouble ticket, the Trouble Ticket Manger creating the trouble ticket and identify the trouble ticket with a work item number, the work item number comprising a telephone number experiencing the problem in the telecommunications system, the Trouble Ticket Manger also distributing the trouble ticket along the communications network to clients;

a Line Record Assembler module for assembling telephone line records, the Line Record Assembler module communicating information from a telephone line record to the Trouble Ticket Manager, the information from the telephone line record comprising at least one of i) customer information from a Customer Record Information System, ii) facility information from a Loop Facility Assignment Control System, and iii) equipment information from a TELCORDIA™ SWITCH system; and a Test Manager module for managing test request of the telecommunications system, the Test Manager module receiving a request for a test of the telecommunications system, the Test Manager module prioritizing the request for the test according to at least one of a date, a time, an origin of the request to create the trouble ticket, and an origin of the request for the test, the Test Manager module submitting the request for the test to a test system conducting the test the telecommunications system, the Test Manager module communicating results of the test to the Trouble Ticket Manger;

a Screening Manger screening the trouble ticket for known indications of the problem in the telecommunications system; wherein screening the trouble ticket includes filtering the trouble ticket for a screening criteria, the screening criteria having a corresponding action; updating the trouble ticket according to the corresponding action, the corresponding action updating at least one of a telephone system status code, a telephone system route code, and a narrative portion describing the telecommunications system, whereby the process screens the trouble ticket for known indications of trouble in the telecommunications system.

* * * * *